US012594588B2

(12) United States Patent
Burke et al.

(10) Patent No.: US 12,594,588 B2
(45) Date of Patent: Apr. 7, 2026

(54) SUCKER ROD WIPING TOOL

(71) Applicant: ConocoPhillips Company, Houston, TX (US)

(72) Inventors: Jason Burke, Houston, TX (US); Matthew White, Houston, TX (US); Joseph Privratsky, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 347 days.

(21) Appl. No.: 18/356,863

(22) Filed: Jul. 21, 2023

(65) Prior Publication Data

US 2024/0075505 A1 Mar. 7, 2024

Related U.S. Application Data

(60) Provisional application No. 63/373,573, filed on Aug. 26, 2022.

(51) Int. Cl.

| | |
|---|---|
| ***B08B 9/023*** | (2006.01) |
| ***A46B 9/02*** | (2006.01) |
| ***A46B 13/00*** | (2006.01) |
| ***A46B 13/02*** | (2006.01) |
| ***A46D 1/00*** | (2006.01) |
| ***B08B 13/00*** | (2006.01) |
| ***B08B 15/04*** | (2006.01) |
| ***E21B 19/00*** | (2006.01) |

(52) U.S. Cl.
CPC .............. *B08B 9/023* (2013.01); *A46B 9/026* (2013.01); *A46B 13/001* (2013.01); *A46B 13/02* (2013.01); *A46D 1/0207* (2013.01); *B08B 13/00* (2013.01); *B08B 15/04* (2013.01); *E21B 19/00* (2013.01); *A46B 2200/3013* (2013.01); *B08B 2209/02* (2013.01)

(58) Field of Classification Search
CPC ......... B08B 9/023; E21B 12/06; E21B 19/00; A46B 9/026
See application file for complete search history.

(56) References Cited

U.S. PATENT DOCUMENTS

| | | | | |
|---|---|---|---|---|
| 2,702,083 A | | 2/1955 | Wagner | |
| 4,050,514 A | | 9/1977 | Prenn | |
| 4,877,386 A | | 10/1989 | Hinds et al. | |
| 5,735,010 A | * | 4/1998 | Burner | B08B 1/32 15/104.04 |

(Continued)

FOREIGN PATENT DOCUMENTS

CN 210509023 U * 5/2020

OTHER PUBLICATIONS

Sucker rod failure analysis Report (Report from Norris—A Dover Company) 2007.

*Primary Examiner* — Shay Karls
(74) *Attorney, Agent, or Firm* — Boulware & Valoir PLLC

(57) ABSTRACT

Method of cleaning sucker rods using a portable cleaning tool containing a rotating brush assembly to remove scale and corrosion residue on the sucker rods is described herein. The brush is annular with an empty or hollow center, such that the rod can penetrate through the hole in the brush. The tool is powered by air compression, and also contains a mechanism of removing the collected debris for disposal. The cleaning tool assembly could be either a standalone device on site placed on a mounted rack, or could be attached to the rod to be cleaned.

17 Claims, 13 Drawing Sheets

(56) References Cited

U.S. PATENT DOCUMENTS

| | | | | |
|---|---|---|---|---|
| 8,920,570 | B2 | 12/2014 | White | |
| 10,744,546 | B2 * | 8/2020 | Goudis | A46B 13/02 |
| 2011/0108278 | A1 * | 5/2011 | Holtby | E21B 17/006<br>166/173 |
| 2016/0175899 | A1 * | 6/2016 | Dunkin | B08B 9/045<br>226/143 |

* cited by examiner

SUCKER ROD WIPING TOOL

PRIOR RELATED APPLICATIONS

This application claims priority to U.S. Ser. No. 63/373,573, filed Aug. 26, 2022, and incorporated by reference in its entirety for all purposes.

FEDERALLY SPONSORED RESEARCH STATEMENT

Not applicable.

FIELD OF THE DISCLOSURE

The disclosure generally relates to methods and tools for cleaning pumping rods for reuse.

BACKGROUND OF THE DISCLOSURE

Once the natural drive is diminished by production, oil does not have enough pressure to flow up the tubing to the surface and is brought to the surface by artificial lift. One of the most widely used artificial lift systems is the beam pumping or sucker-rod pumping system (also called simply as a rod pumping system). This pumping system is composed of many components—some of which operate above ground and some underground. See FIG. 1.

A rod pump (or insert pump) is run into the bottom of the well as a complete unit. In its simplest form the bottom-hole pump consists of a plunger working up and down in a closely fitted barrel. The plunger contains a check valve that permits fluid flow upward but not downward. Also called traveling valve, this check valve is usually of the ball-and-seat type in most modern pumps. This underground machinery is primarily driven by a surface pumping unit consisting of a motor and a fixed beam on the surface. The beam rocks up and down providing the driving force for the pump. Sucker rods connect the surface and the downhole components of the rod pumping system and allow fluid flow to the surface.

Sucker rods are hollow tubes most commonly made up of steel alloys. FIG. 2 shows an exemplary sucker rod. These rods are generally between ⅝, ¾, ⅞ and 1 inch diameter and usually 25-30 ft long. They are threaded at each end, female at one end and male at the other, to enable the downhole components to be strung together to reach the well bottom, and be deployed and retrieved easily. Sucker rods are also commonly available made of fiberglass in 37½ foot lengths and diameters of ¾, ⅞, 1, and 1¼ inch. These terminate in metallic threaded ends, so that they may be connected end to end.

Sucker rod strings lift heavy weight with every cycle and are under stress during downstroke as well as the upstroke. Thus, they are highly stressed and often fail because of these repeated load reversals.

Along with mechanical impacts, chemically induced damage to the sucker rods is common. These include corrosion damage due to the operation environment being rich in water, $H_2S$, and/or $CO_2$. Paraffin in the crude oil may also congeal in deposits on the rods.

Scale deposits, especially caused by corrosion on steel when the water cut of the operating well start increasing, is also a common chemical problem encountered by the sucker-rods. Carbonate scales formed on the sucker rods (as a by-product of corrosion) coats the rods. This slows corrosion, but if the carbonate deposits keep building up, it can increase the stress on the rods and result in mechanical failures. High tensile strength sucker rods should therefore be adequately protected against corrosion and scale deposition. This is usually achieved in the field by batch treating the rods with corrosion inhibitors. This further adds to the operating expense of production.

Once mechanically and/or chemically damaged, the rods may need replacing, but replacing sucker-rods is one of the most expensive tasks of a beam-pump system. In order to determine whether to replace or re-use the rods, they must be free from chemicals and/or oil residue as damage can be assessed only when the rods are clean.

Traditionally, a steel brush is abraded against the rod to clean out all deposits on and in the rod. This process is highly labor intensive, and the use of hand brush may leave some unreachable areas unclean on the rods. For example, in U.S. Pat. No. 405,051, deposited paraffins on sucker rods are removed using paraffin scrapers. These scrapers, however, are placed near the surface and scrape off only part of the rods. Paraffin scrapers have been useful in reducing expensive measures of removing deposits on the rods like hot oiling. But since paraffin scrapers do not completely remove the paraffin deposits from the rods, they are always coupled with other mechanical cleaning equipment.

Another method used to clean the rods is sand blasting wherein a rod to be cleaned is completely removed from the well and fed into a sandblasting cleaning station (e.g., U.S. Pat. No. 4,877,386). The rod is kept stationary, and a group of sandblasting nozzles radially move to clean out the rod. For this process, the rod is removed from the wellhead, physically moved to the sandblasting station and inserted between the nozzles for thorough cleaning.

Although sandblasting is a thorough cleaning process, it has several disadvantages, especially the need to physically remove the rods and transport them to the sandblasting station. This can add several days downtime before operations can resume at the well site. Another disadvantage is that large quantities of fines spent blasting the sand requires disposal, which is both troublesome and expensive to mitigate. Also, the nozzles used in a sandblasting process lead to "feathered" edges, rather than sharp and defined edges as needed for the threaded connectors. The rods in a wellhead normally have well defined specifications and by creating "feathered edges" the rods may lose their required specification, leading to expensive measures to re-adjust the rods.

Chemical solvent blasting can be used instead of sandblasting techniques. In this technique, the rod is removed from the beam pump and taken to a chemical cleaning station where is blasted with chemicals solvents such as kerosene for a period of time to rid of all the unwanted particles adhering to the rod. Potentially dangerous solvents like xylene, toluene, naphtha or caustic soda may also be used for the process depending on the extent of chemical deposition on the rods. Blasting with solvents does not lead to uniformly cleaned rods, however, and extensive inspection time is invested to check and clean them out. Further, the solvents themselves are toxic for people and can present fire and explosion hazards.

In US20140124001 application of non-toxic solid particles capable of sublimation are used as cleaning agents. These are used at a very low temperature to remove contaminants from the sucker rods using thermal-kinetic energy by causing sublimation of the particles to expand. The resulting micro-explosions remove contaminants. However, this process also requires physically removing the sucker rods and taking them to a station with non-toxic solid particle cleaning agents.

Although all of these methods for removing contaminants from the sucker rods exist, current solutions still result in loss of productivity, impact the overall quality of the rods, and increase the costs of operation.

Thus, what is needed in the art are better methods and tools to clean deposits from rod strings before reusing or scrapping the rod strings. The ideal tool will be portable, allow the rods to be cleaned on location without transporting them off-site, have mechanism for removal of debris and also be reliable and cost-effective. This invention addresses one or more of these needs.

SUMMARY OF THE DISCLOSURE

The present disclosure is directed to methods and tools for cleaning tubulars such as sucker rods, production tubing and drill string at well head sites. This involves portable cleaning equipment that can be present on site and used whenever cleaning is required. An air powered tool with wiper rings and a rotating brush element for removal of deposits due to scale or corrosion and other residue from the tubulars is disclosed.

The rod cleaning tool described herein includes an assembly that is fluidly connected to an air compressor. The air compressor drives a pinion gear, which in turn drives a circular planetary gear ring inside the cylindrical assembly to rotate the planetary gear. Brushes attached to the inner surface of the planetary gear (directly or indirectly) allow cleaning of the sucker rod. Since the bristles are on the interior surface of the annular ring, the brush is also annular. The bristles are sized so as to leave a gap or hollow in the center of the brush, and the rod is inserted into that hole for cleaning.

In one embodiment of the present disclosure, a vacuum line is attached to the tool to suction off all the debris and collect it in a drum onsite for further processing. Typically, the hose, trap and vacuum are outside the housing, but they could also be inside. The vacuum pump and trap may be a part of the tool, but may also be separate therefrom as any drum may suffice as a trap.

In some embodiments, the tool is mounted directly onto a separate pipe rack. However, it can also be a standalone device with its own mounting rack or the mounting rack may be omitted.

In one embodiment, the brush inside the rod cleaning tool is made of nylon. In other embodiments, the brush may be soft stainless-steel wool or made of brass. Combinations of bristle types are also possible. The tool may be sold with a variety of interchangeable brush heads, thus allowing a stiffer brush for scale and a softer brush for less rigid deposits.

In another embodiment, one or more split wiper rings are part of the tool and open via a latch and hinge mechanism to allow the sucker rod to be placed therein. In some variations, the wiper ring precedes the brushes, and wipe the rods free of easily removed deposits, allowing the brushes to tackle the more difficult deposits. In other embodiments, the wiper rings are positioned after the brush. In preferred embodiments there are a pair of split wiper rings bracketing the brush section.

In still other embodiments, the wiper rings are flexible, such that a hinge and latch mechanism is not needed, as the wiper rings flex enough to allow sucker rod entry. However, it is preferred that the wiper rings are pretty stiff (e.g., shore A 60-100, or 70-90), thus scraping off significant hard and soft debris. Suitable materials for the wiper rings include resins, rubber, resin- or rubber-coated metal. Suitable resins may include styrene butadiene, nitrile rubber, hydrogenated nitrile, carboxylated nitrile, fluorocarbon, and the like. One preferred material is polyurethane, such as MAXITHANE® by Inline, which is specially formulated for the rigorous conditions downhole. Another possibility is nitrile or polyurethane molded over high-density plastic or aluminum cores.

A "planetary gear system" as used herein are epicyclic gears consisting of two gears mounted so that the center of one or more gear(s) (called planet gear(s)) revolve around the center of the other (called sun gear). A carrier connects the centers of the two gears and rotates the planet and the sun gears such that the sun gear is fixed and the planet gear(s) roll around the sun gear. These systems are highly efficient in load distribution and are widely used in applications that require compact design. Herein we used a single large planetary gear with external teeth, driven by a single smaller sun gear with external teeth that itself is driven by air motor. Other gears that could be used herein include helical gears, metal bevel gears, high-power metal miter gears, high-power metal bevel gears, and the like.

The use of the word "a" or "an" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim. The phrase "consisting of" is closed and excludes all additional elements. The phrase "consisting essentially of" excludes additional material elements but allows the inclusions of non-material elements that do not substantially change the nature of the invention, such as instructions for use, buffers, and the like. Any claim or claim element introduced with the open transition term "comprising," may also be narrowed to use the phrases "consisting essentially of" or "consisting of," and vice versa. However, the entirety of claim language is not repeated verbatim in the interest of brevity herein.

DETAILED DESCRIPTION

In order to maintain and clean sucker rods in operation without sending them to a different site for cleaning, a portable cleaning tool is described herein.

Figure 1:
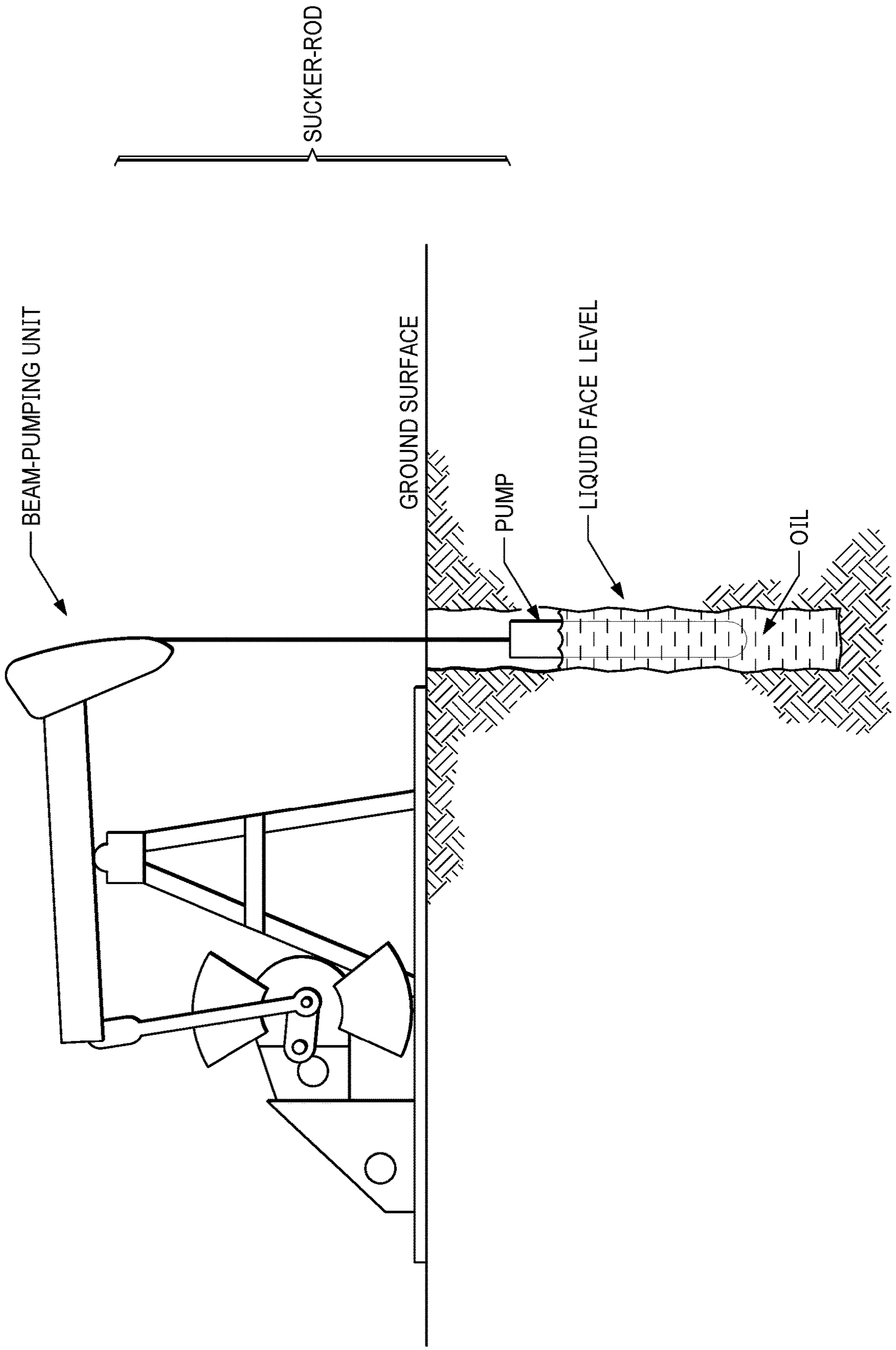
FIG. 1. (Prior Art) A typical beam pumping unit with the sucker-rod assembly.
Figure 2:
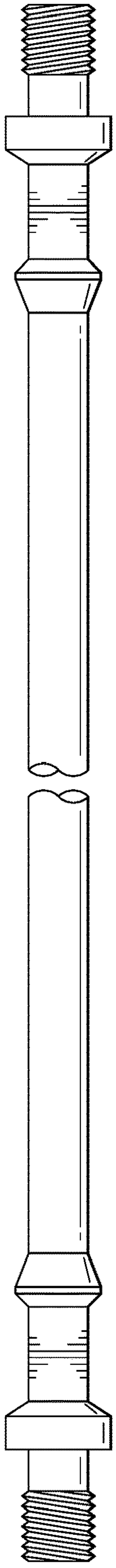
FIG. 2. (Prior Art) Close up view of a sucker rod.
Figure 3A:
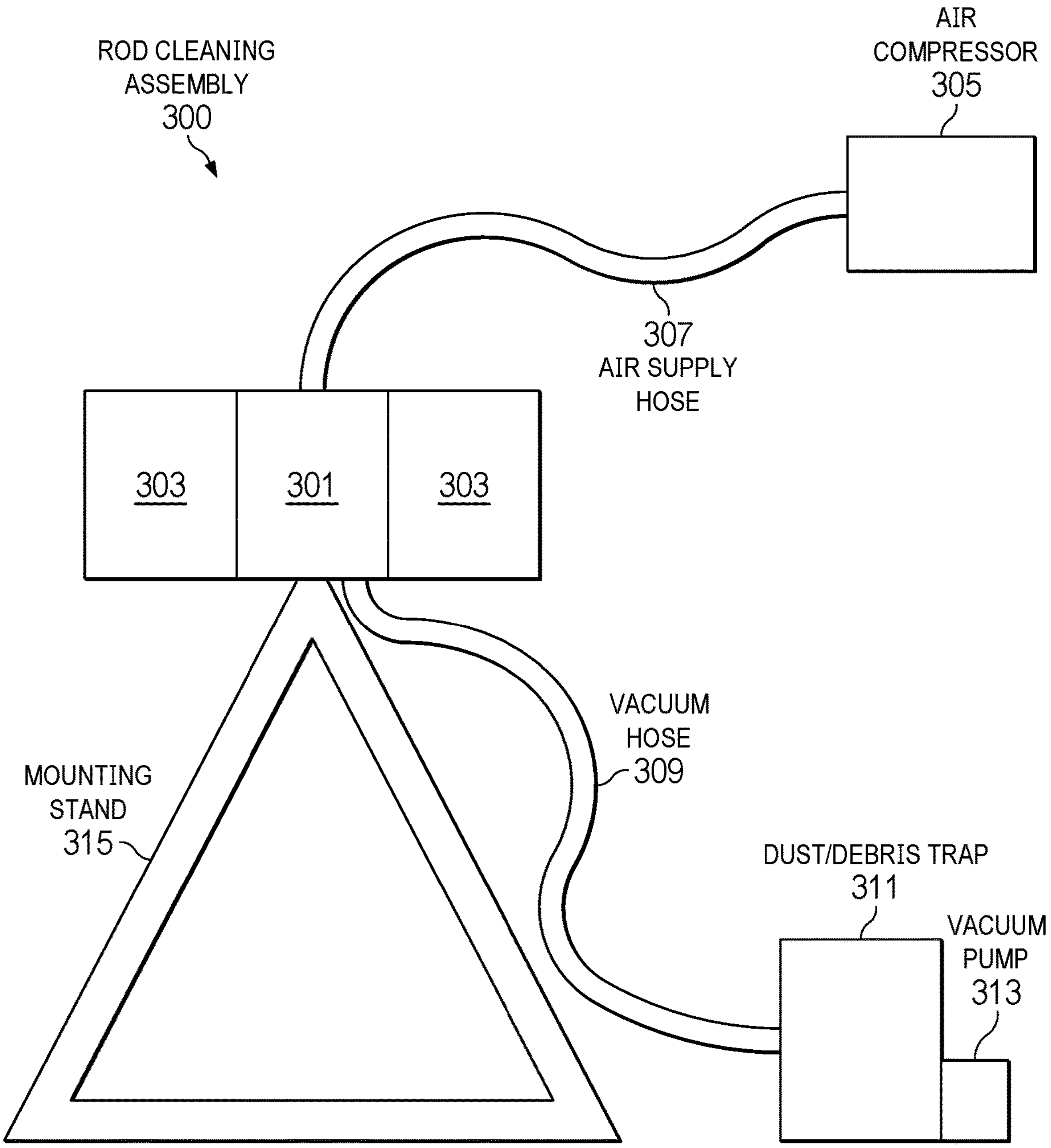
FIG. 3A. Rod cleaning assembly.

FIG. 3A shows a simple schematic of an exemplary rod cleaning assembly 300 for cleaning sucker rods. The brush housing section 301 is flanked by wiper ring sections 303, in this embodiment one on each side of the brush housing section 301. Wipers may be at one end, both ends, or omitted entirely, but it is preferred to have one at the beginning to remove soft deposits and one at the end (after the brush) to wipe off any debris dislodged by the brushes. This also allows for bidirectional cleaning, if the sucker rod is moved back and forth for cleaning as preferred.

Figure 3B:
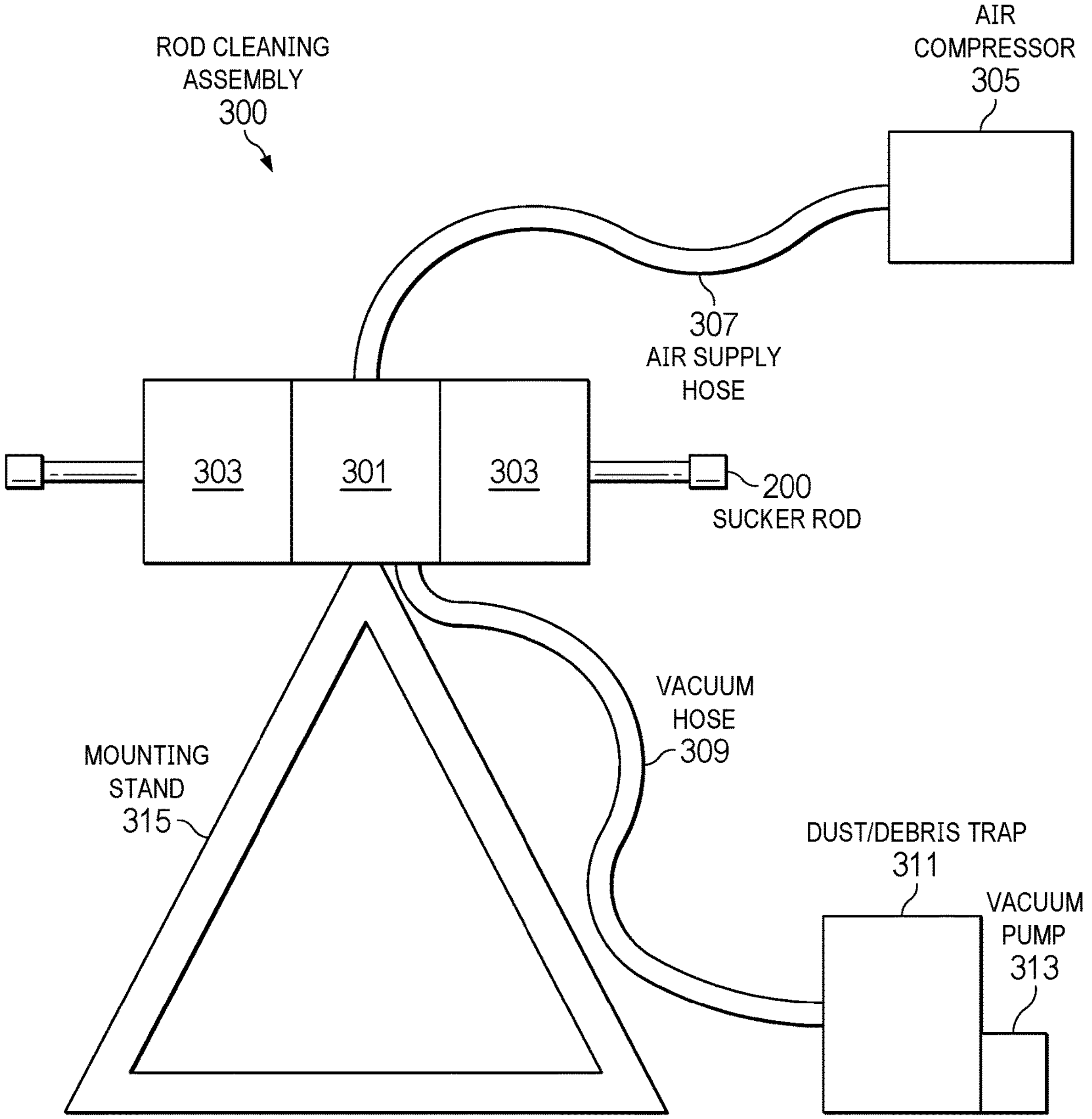
FIG. 3B. Rod cleaning assembly together with sucker rod.

Air supply hose 307 provides air from the compressor 305 to the air motor (not visible in FIG. 3, but see FIG. 5) and a vacuum hose 309 and vacuum pump 313 pulls any debris, dust and fines out of the tool and captures same in the dust caddy or trap 311. The entire assembly 300 may be placed on a pipe rack or have its own mounting stand 315. FIG. 3B shows a second view with a sucker rod 200 placed into the rod cleaning assembly 300.

We have shown the air compressor as outside the unit, but it could also be integral and containing within the housing. However, a separate air compressor is preferred as minimizing tool size and increasing portability. Likewise for the vacuum pump. If preferred, the air motor can be exchanged with an electric motor, but our current preference is for air motors to drive the various gears.

Figure 4A:
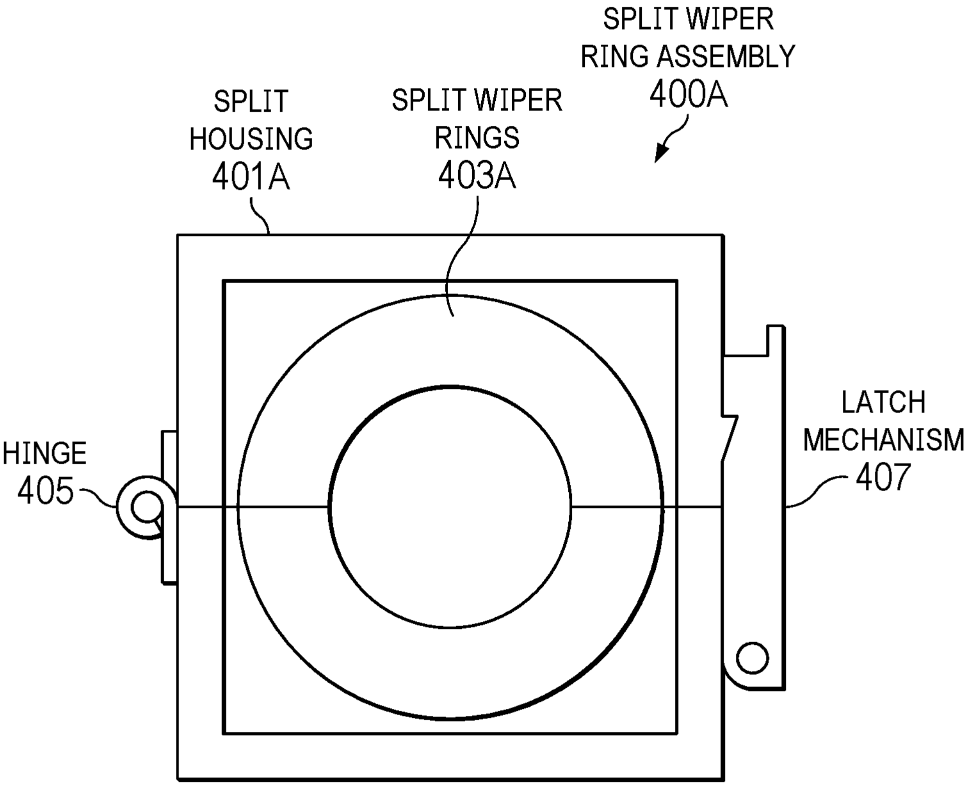
FIG. 4A. Cross section of a split wiper assembly.
Figure 4B:
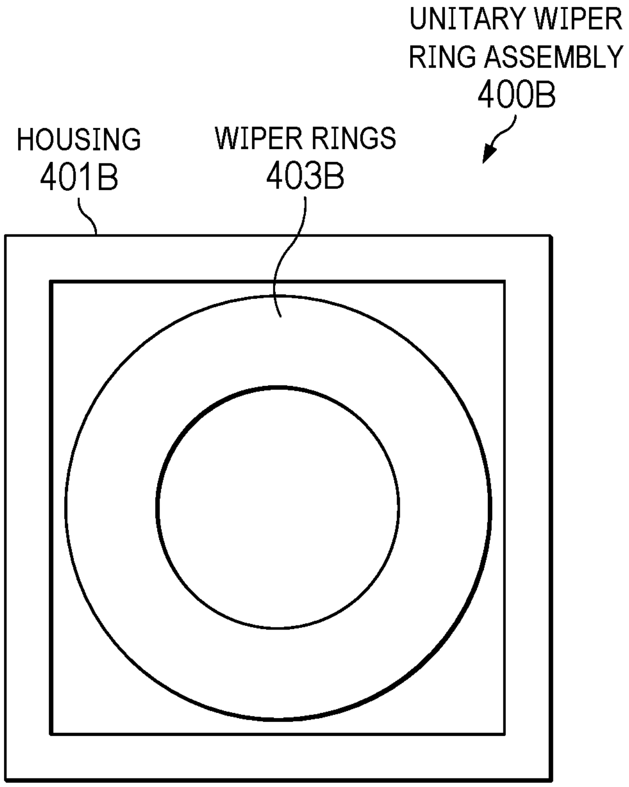
FIG. 4B. Cross section of a unitary wiper assembly.

FIG. 4A shows a cross section of one embodiment of a wiper ring assembly 400A. Here the housing 401A is split, and hinge 405 and latch 407 hold the split wiper rings 403A in place over the rod. This embodiment may be suitable for a hard durometer wiper ring, that is insufficiently flexible to allow entry of the enlarged ends of the sucker rod. Thus, the housing can be opened, and the rod placed therein. However, if desired a softer material with more flex may be used instead, and a unitary housing and ring assembly used instead as shown in FIG. 4B, which shows unitary housing 401B and unitary wiper ring 403B. Otherwise, the numbering of parts is the same as in 4A.

Figure 5:
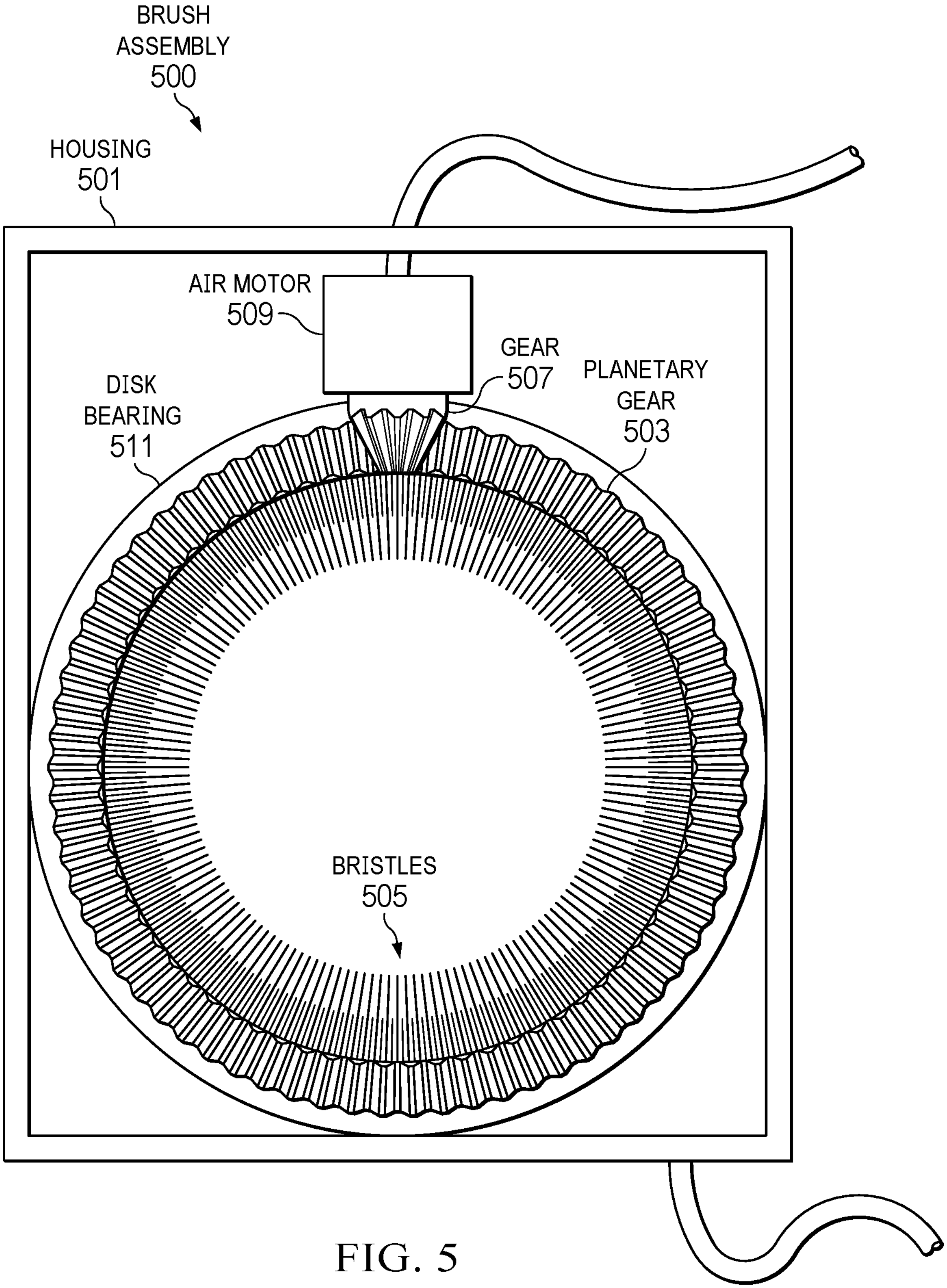
FIG. 5. Cross section of a rotating brush assembly.

FIG. 5 is a cross section of the brush housing assembly 500. The housing 501 contains planetary gear ring 503 with bristles 505 on its inner surface. The bristles may be on a separate annular ring so that the brushes may be easily exchanged with a fresh brush, or the gear and bristles can be unitary with gears on an exterior surface of an annular ring and bristles on an interior surface.

The housing will of course need to allow access to the interior in order to change out the brushes and/or wiper rings, and thus may have a hinged door or removable hatch or the entire device may hinge open in the same way that the split wiper section opens. However, these details are omitted for simplicity in this figure.

A sun gear 507 drives the planetary gear 503 and causes the brushes 505 to scrape the sucker rod (not shown). A disk bearing 511, raceway, three or more roller bearings, or other support supports the planetary gear, allowing it to rotate, while being held in place inside the housing. There may be two disc bearings, one on each side of the ring, leaving the enter free for sun gear contact. Alternatively, three or more roller bearings may be positioned around the annular ring, allowing it to be held in position and still rotate.

Although not visible in this figure, the device could have more than one planetary gear and brush, each moving in opposite directions, to prevent the rod from spinning under the friction (see instead FIG. 6). Alternatively, the brush housing assembly can be provided with clamps on an inner surface to grip the sucker rod and prevent its spinning. As yet another possibility, the support stand may provide a clamp for one or both ends of the rod.

A compressed air drive or 'air motor' 509 connects to the sun gear 507 and provides the power to rotate the brush. However, an electric motor could be used if preferred. In addition, although we discuss a planetary and a sun gear, other gear arrangements will work as well.

We have shown the housing 501, planetary gear 503 and brush 505 as each unitary, since the bristles are expected to be flexible enough to allow the ends of the rods to pass therethrough, but if desired, these could also be split to allow the device to open to receive the sucker rod, then closed and latched in place. This will complicate the tool, but may be needed for specialty rods of complex shapes that cannot penetrate a closed annular brush.

The bristles may be nylon or other resin, soft brass, steel, or combinations thereof, and thin enough to flex. The bristles may be arranged in any suitable arrangement, such as in even rows, staggered rows, a stacked hexagonal or triangular arrangement, in a spiral arrangement (which may assist with movement along the rod), etc.

The entire assembly can be moved back and forth, or even up or down, and the brushes accordingly clean out the debris on the stretch of the rod where the cleaning assembly is positioned. This back and forth or up and down driving motion is controlled by controllers on-site and can be manual, or driven by motor, or driven by gears operably coupled with one or more roller bars. If so, these gears can also be driven by air motor and air compressor or by electric motor, as preferred.

Note that these figures are simple schematics, and not intended to reflect actual size, placement and/or shapes, which may vary. For example, the hoses are shown, but may be placed differently. Indeed, the air compressor, vacuum and dust trap may all be contained within the housing, and not external as shown. In addition, housings are shown as boxes, but may be other shapes, e.g., cylindrical. Likewise, the stand is shown as a simple triangle, but may be any suitable shape, and may support the sucker rod as well as the rod cleaning assembly.

Figure 6A:
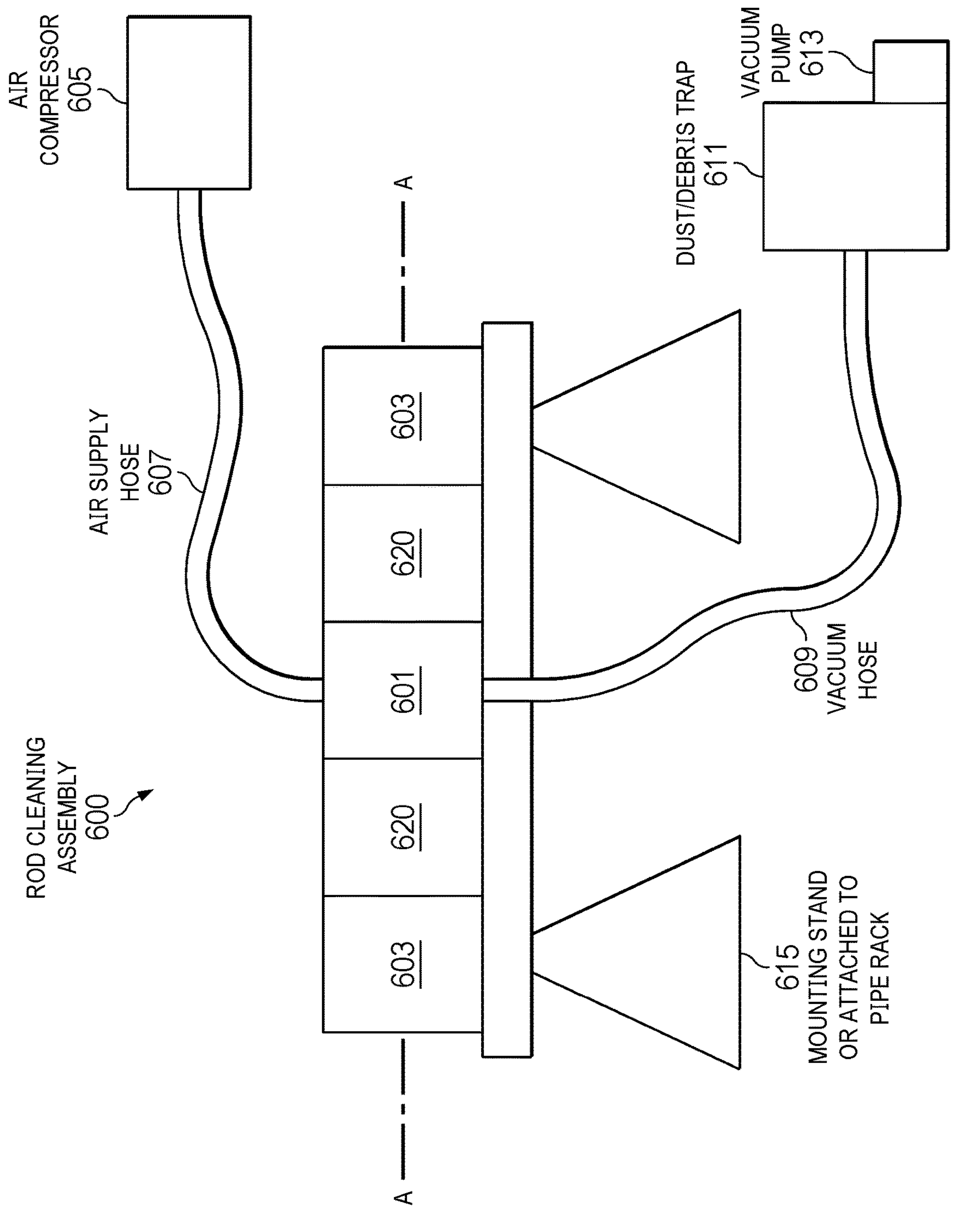
FIG. 6A. Exterior view of another embodiment of the rod cleaner assembly, with roller bar sections to support and control the sucker rods.
Figure 6B:
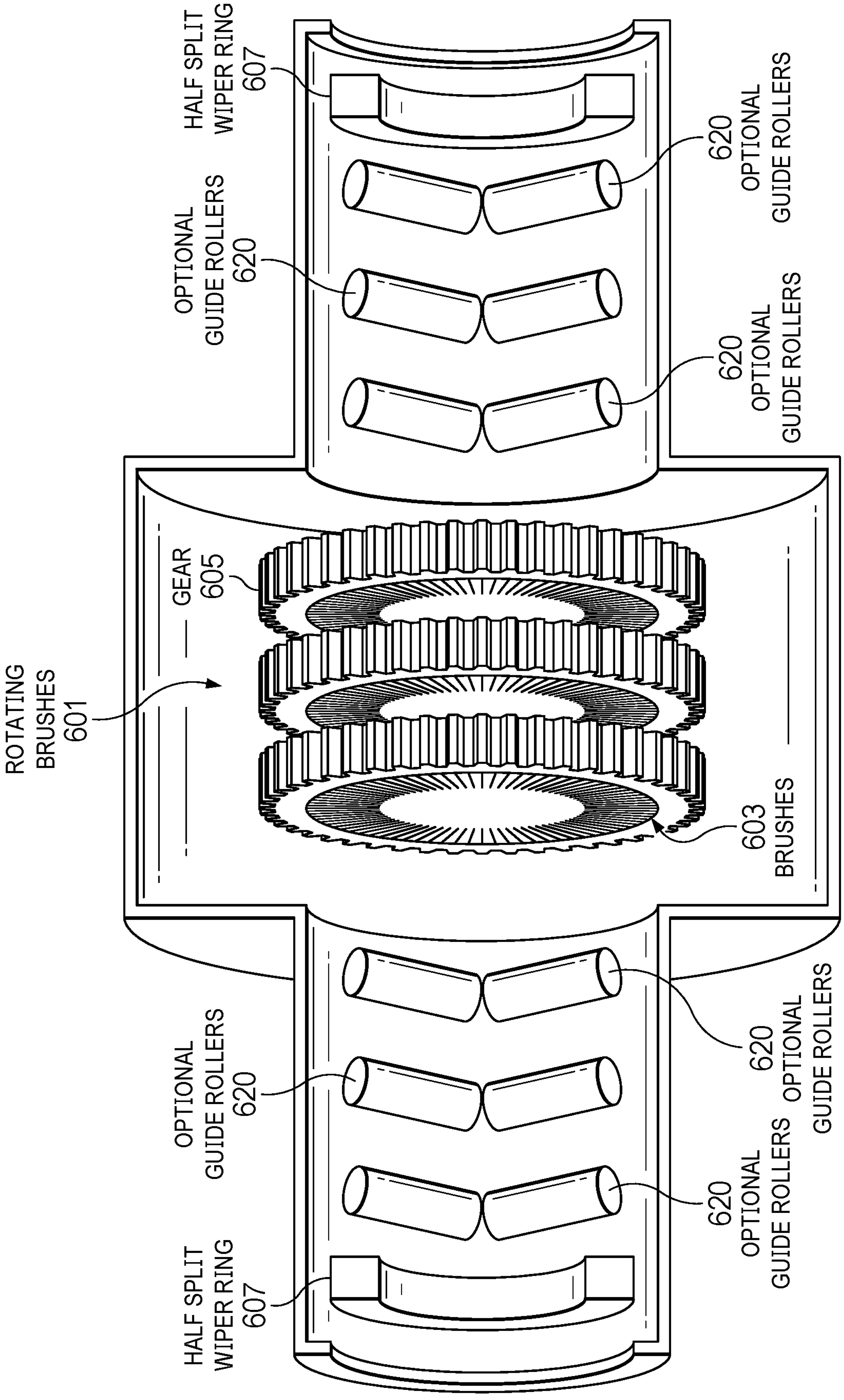
FIG. 6B. Cutaway (along line A-A of 6A) top view of the bottom half of the rod cleaner assembly.
Figure 6C:
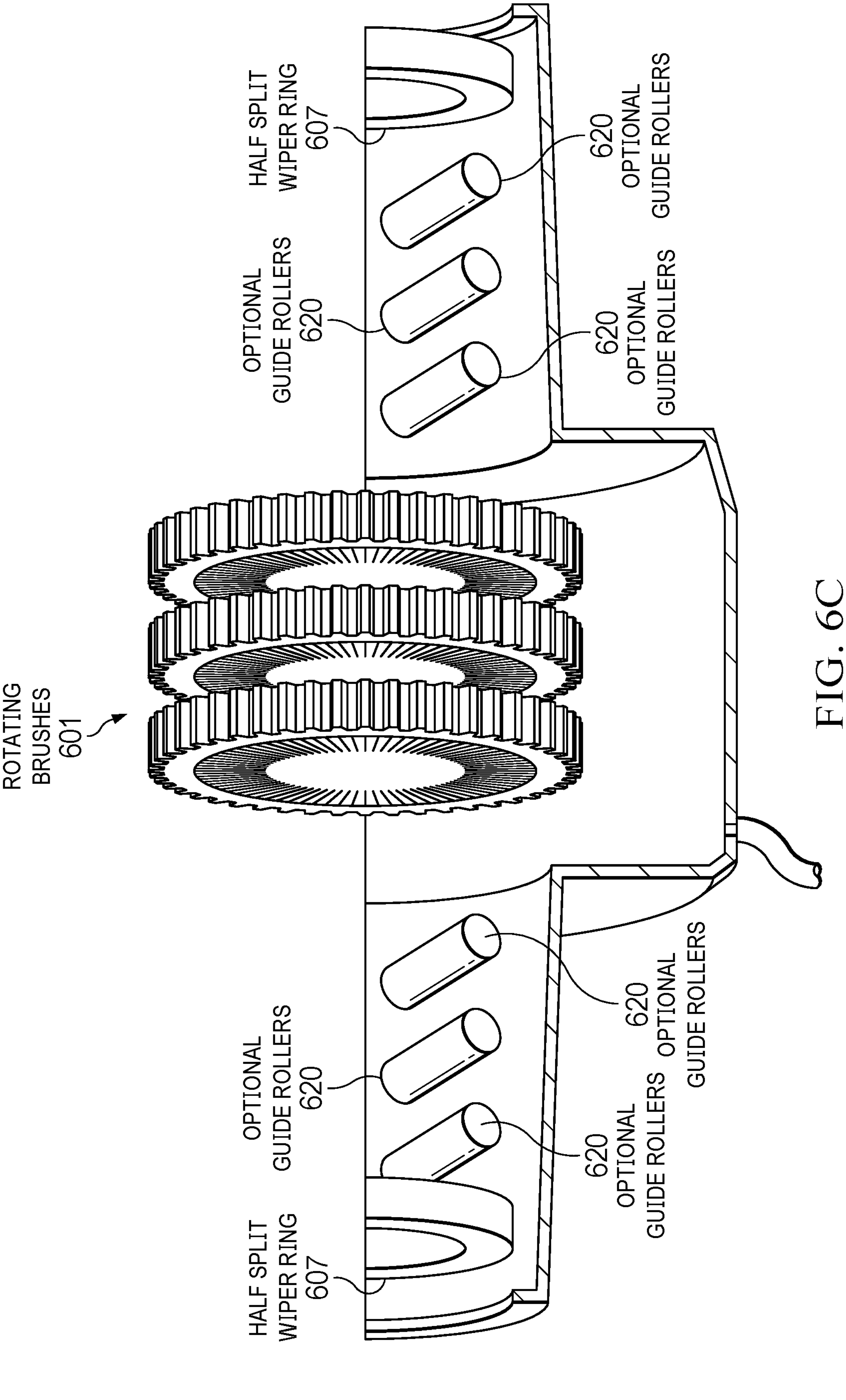
FIG. 6C. Cutaway (along line A-A of 6A) side view of the bottom half of the rod cleaner assembly.

FIG. 6A-C shows a more sophisticated embodiment, wherein two sections for sucker rod support having roller bars 620 are added to support and (if desired) move the rods. The roller bars may be positioned at different places, but herein shown the roller bar 620 sections are inside of the wiper sections. They could also be outside the wiper sections, and there may be a variable number thereof, but preferably at least two. The roller bars need not even be inside the housing, but may instead be part of the support stand.

Further, if one or more of the roller bars are connected to a motor, they can be turned, thus propelling the sucker rod through the tool. Ideally, the device would include sensors to reverse the direction of movement when the device encounters the enlarged end of the sucker rod, thus moving the rod back and forth or up or down through the tool. Preferably, the roller bars are rubber or resin coated, so as to not provide metal-metal contact with the sucker rods and also provide enough friction to move the sucker rod.

In more detail, in FIG. 6A we see an exterior view of the rod cleaner assembly 600 with brush section 601, two wiper sections 603, and two roller bar sections 620. Air supply hose 607 connects to air compressor 605 and drives the motor, which is not visible inside the housing. Mounting stand 615 holds the device at a comfortable working distance, about 39 inches from the ground. Vacuum hose 609 connects to dust/debris trap 611 and vacuum pump 613.

In FIG. 6B see a cutaway version of this embodiment along line A-A, showing a top view of the lower half of the tool assembly. Also seen are the rotating brushes 601 which consist of the planetary gear 605 on the exterior surface of the annular ring, and bristles 603 on the interior surface of the ring. Guide rollers 620, and half of a split wiper ring 607 are also seen. Disk bearings or other supports are omitted for simplicity.

Figure 6D:
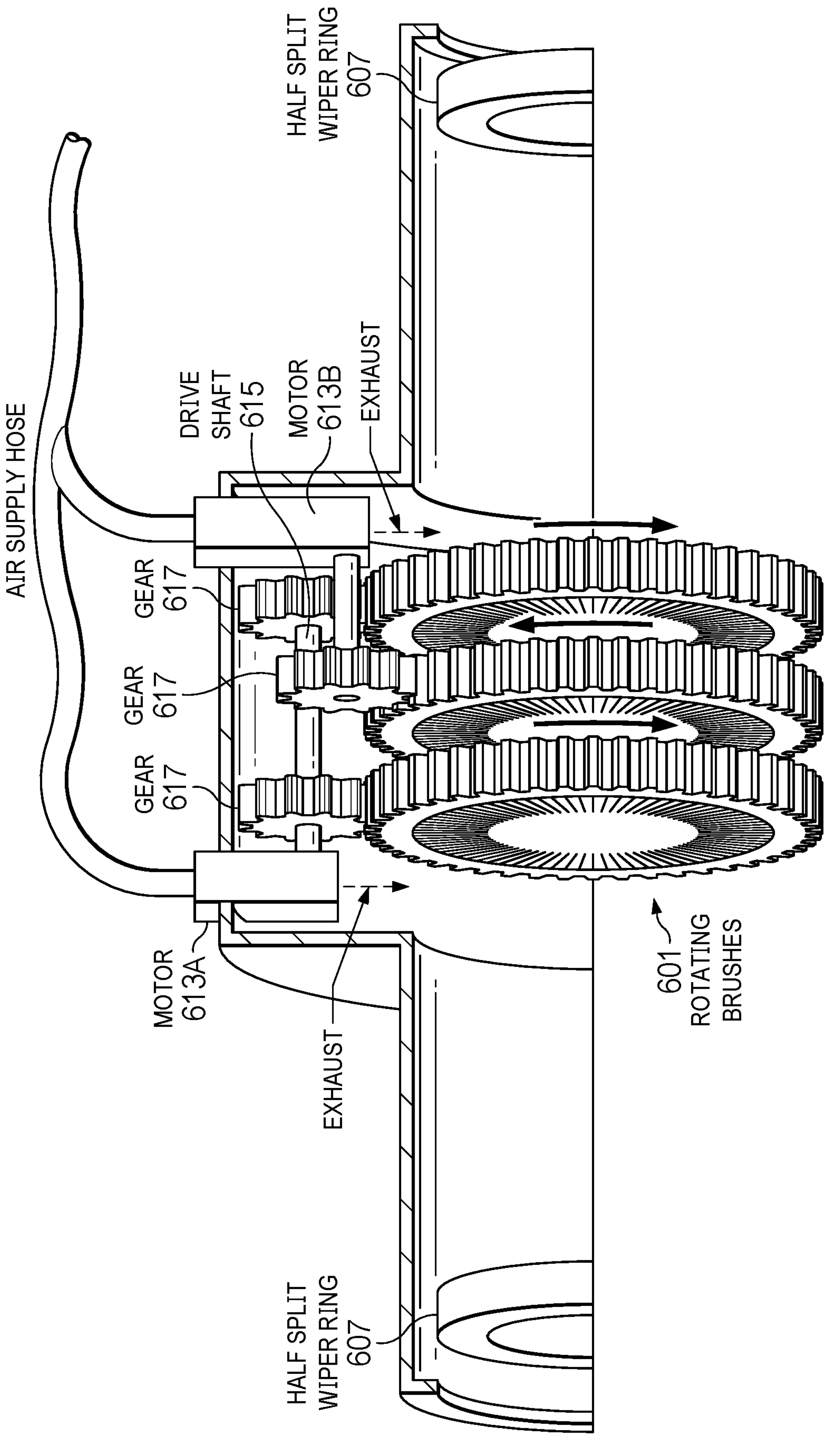
FIG. 6D. Cutaway (along line A-A of 6A) side view of the top half of the rod cleaner assembly.

FIG. 6C shows a side view of the same, and FIG. 6D shows side view of the top half of the assembly, which in this variation houses the air motor 613, three sun or pinion gears 617, and drive shaft 615, together serving to rotate the three rotating brushes 601. In this variation, there are three brush rings driven by three gears, the center one of which turns in the opposite orientation, thus driving the brush rings in the directions shown, but other arrangements are possible.

Figure 7:
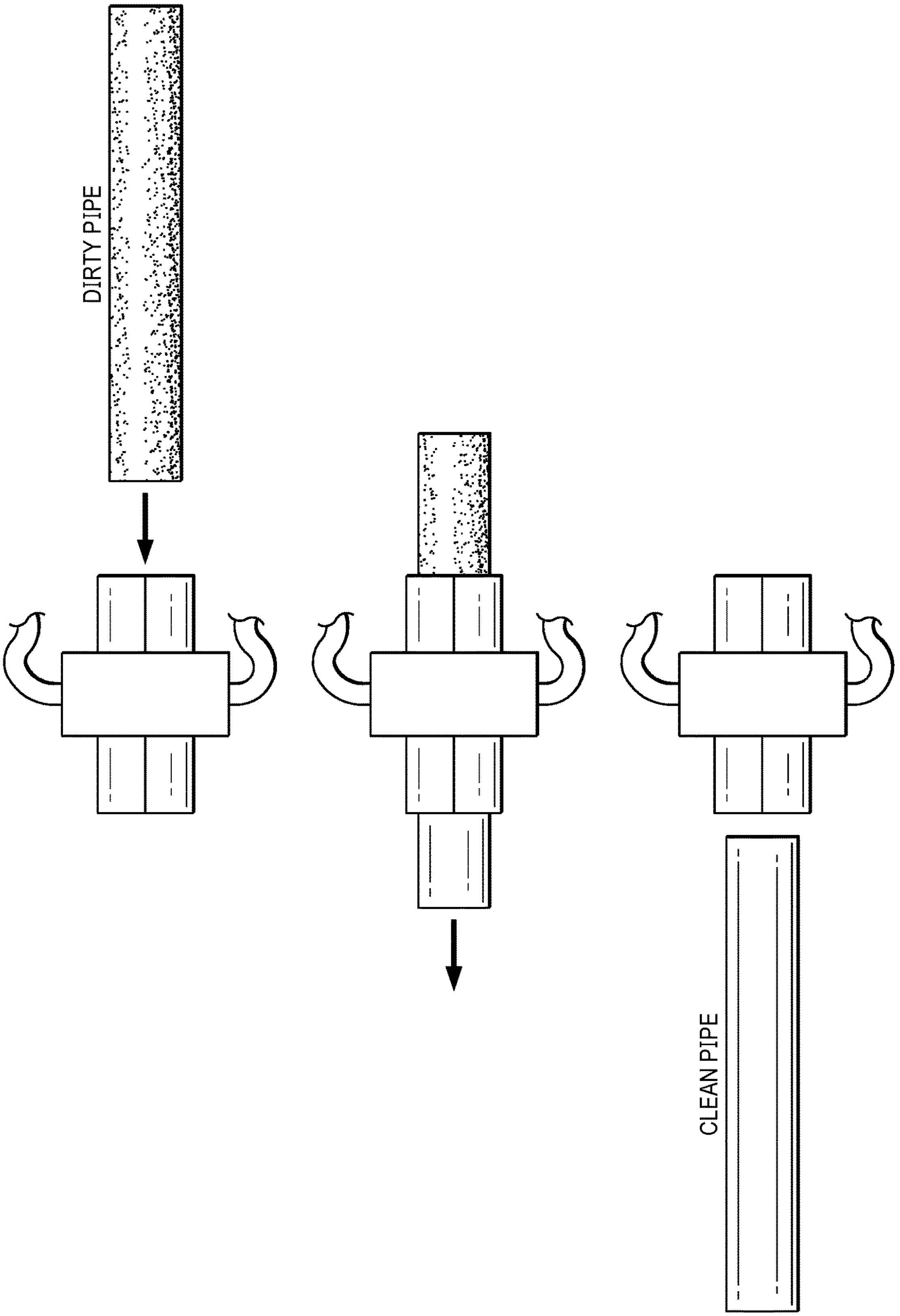
FIG. 7. Rod cleaner assembly shown cleaning a sucker rod.

An exemplary portable sucker rod cleaning device may be located on-site during production operations. When cleaning of the sucker rod is desired, the sucker rods are pulled from the well. The cleaning tool assembly is placed on a mounting rack and each sucker rod needing cleaning is inserted into the tool in sequence. If a split wiper assembly is used, the wiper housing is latched in place. After proper adjustment and assessing zones on the rod to be cleaned, the air-powered motor is turned on to activate the planetary ring gear system to clean the rod. By left and right motion of the cleaning assembly, which may be an externally applied force, or internally applied by the roller bars or other mechanism, the brush will clean the rod of debris. The debris removed by the brush will fall to the bottom of the cylindrical cleaning assembly where it is suctioned off using a vacuum hose. All the suctioned debris is collected in a drum on-site for safe disposal. See e.g., FIG. 7. In another method, the tool is mounted at the well head to clean sucker rods as they are deployed or as they are returned to the surface.

Figure 8:
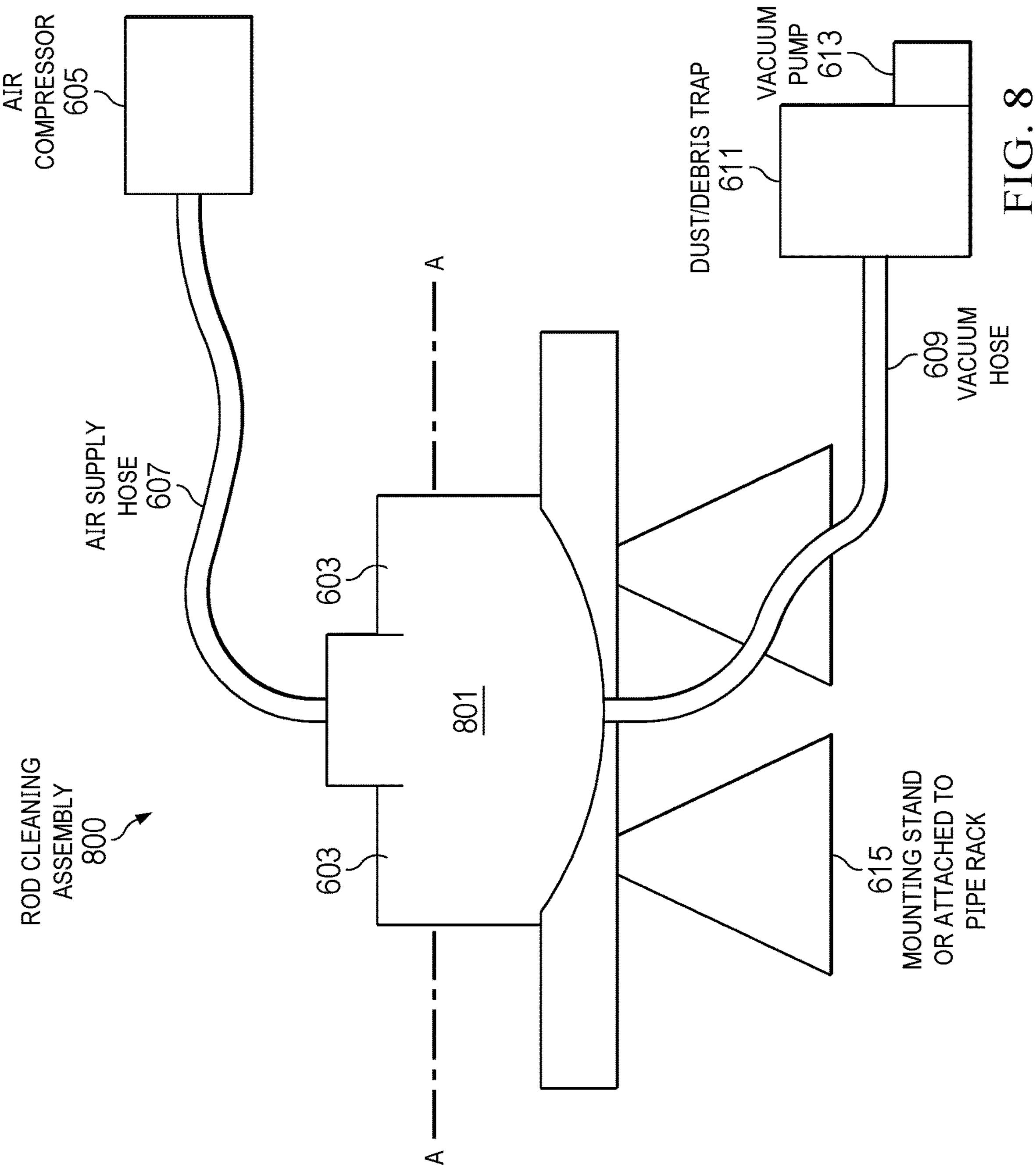
FIG. 8. Tool with housing shaped to channel debris to outlet by gravity.

We have shown the housing as having a flat base, but a conical base would aid in debris collection and removal. See FIG. 8 showing a rod cleaning assembly 800 with a brush section 801 having a conical base to more easily channel debris to the vacuum hose. All other numbers are as in FIG. 6.

The invention includes any one or more of the following embodiments, in any combination(s) thereof.

A tool for cleaning sucker rods, said tool comprising a housing assembly containing:
i) an annular ring having gear teeth on an exterior surface thereof and bristles on an interior surface thereof with a central hollow or gap in said bristles for insertion of a rod to be cleaned;
ii) a gear operably connected to said gear teeth to rotate said annular ring and bristles;
iii) a motor operably connected to said gear to rotate said gear; and
iv) an outlet operably positioned on a lower surface of said housing for debris to exit said housing.

A tool for cleaning sucker rods, said tool comprising a housing assembly containing:
i) an annular ring assembly having gear teeth on an exterior surface thereof and bristles on an interior surface thereof with a central hollow or gap in said bristles for insertion of a rod to be cleaned;
ii) a gear operably connected to said gear teeth to rotate said annular ring assembly and bristles;
iii) an air motor operably connected to said gear to rotate said gear and thereby rotate said annular ring assembly and bristles; and
iv) an outlet operably positioned on a lower surface of said housing for debris to exit said housing, said housing shaped to gravity drain said debris to said outlet.

Any tool herein described, said housing further comprising one or more wiper ring sections for wiping a sucker rod, or said housing further comprising one or more split wiper ring sections for wiping a sucker rod, said split wiper sections capably of hingedly opening and latching closed over a sucker rod and containing split wiper rings for wiping said sucker rod.

Any tool herein described, having two split wiper rings, one on each side of said annular ring.

Any tool herein described, wherein said outlet is fluidly connected to a debris trap and a vacuum pump and said motor is an air motor that is fluidly connected to an air compressor.

Any tool herein described, wherein said air compressor or vacuum pump or both are inside said housing, or wherein said air compressor or vacuum pump or both are exterior to said housing and are separate devices, not part of the tool.

Any tool herein described, further comprising a mounting stand for supporting said housing at about 30-45 inches off the ground.

Any tool herein described, wherein the support stand or the housing has a clamp to prevent sucker rod rotation when the tool is activated.

Any tool herein described, wherein said bristles comprise nylon, stainless-steel, brass or combinations thereof, but nylon bristles may be preferred.

Any tool herein described, wherein said housing is shaped to allow debris to collect near said outlet by gravity.

Any tool herein described, said tool further comprising motor driven roller bars configured to support and move said sucker rod. The roller bars may be inside the housing or be part of the stand, as desired. In yet another embodiment, the tool further comprises sensors and one or more motor driven roller bars configured to support and move a sucker rod in a back and forth, or even up or down direction when placed in said tool, said sensors detecting an end of said sucker rod and switching a direction of rotation of said one or more roller bars. These roller bars may be inside the housing, or may be outside the housing and part of the support stand, as desired.

-continued

A method of cleaning sucker rod on wellhead, said method comprising:
a) removing a sucker rod from a well;
b) placing said sucker rod into any tool herein described;
c) operating said tool for a period of time to clean said sucker rod till sucker rod is rid of all debris;
d) inspecting said sucker rod for reuse or replacement;
e) reusing or replacing said rod in said well; and
f) repeating steps a-e for each additional sucker rod in said well.
A method of cleaning sucker rod on wellhead, said method comprising:
removing a sucker rod from a well;
placing said sucker rod into any tool having one or more split wiper ring sections;
closing and latching said one or more split wiper ring sections over said sucker rod;
operating said tool for a period of time to clean said sucker rod till sucker rod is rid of all debris;
inspecting said sucker rod for reuse or replacement;
reusing or replacing said rod in said well; and
repeating steps a-f for each additional sucker rod in said well.
Any method herein described wherein said sucker rod cleaning tool is attached to the wellhead and cleans sucker rods in situ. Alternatively, the sucker rod cleaning tool is mounted on a mounting stand on site near said well.

The following references are incorporated by reference in their entirety for all purposes:

US20140124001 Methods and apparatus for cleaning oilfield tools.

U.S. Pat. No. 2,702,083 Sucker rod centralizer and paraffin scraper.

U.S. Pat. No. 4,050,514 Paraffin sucker rod scraper and rod centralizer.

U.S. Pat. No. 4,877,386 Automated sucker rod cleaning apparatus.

A special report from NORRIS, available as "Sucker rod failure analysis". perf-chem.com/storage/UserFileFolder/Norris_Brochure_2.pdf.

The invention claimed is:

1. A tool for cleaning sucker rods, said tool comprising a housing assembly containing:
- a) an annular ring assembly having gear teeth on an exterior surface thereof and bristles on an interior surface thereof with a central hollow or gap in said bristles for insertion of a separate rod to be cleaned;
- b) a gear operably connected to said gear teeth;
- c) a motor operably connected to said gear to rotate said gear and thereby rotate said annular ring assembly and bristles;
- d) an outlet operably positioned on a lower surface of said housing for debris to exit said housing, wherein said outlet is fluidly connected to a debris trap and a vacuum pump; and
- e) a mounting stand for supporting said housing horizontally at about 30-45 inches off the ground.

2. The tool of claim 1, said housing further comprising one or more wiper ring sections for wiping said separate rod.

3. The tool of claim 2, having two split wiper rings, one on each side of said annular ring.

4. The tool of claim 1, said housing further comprising one or more split wiper ring sections for wiping said separate rod, said split wiper sections able to hingedly open and latch closed over said separate rod and containing split wiper rings for wiping said separate rod.

5. The tool of claim 1, wherein an air compressor or said vacuum pump or both are inside said housing.

6. The tool of claim 1, wherein an air compressor or said vacuum pump or both are separate from said tool and exterior to said housing.

7. The tool of claim 1, wherein said bristles comprise nylon, stainless-steel, brass or combinations thereof.

8. The tool of claim 1, wherein said bristles are made of nylon.

9. The tool of claim 1, wherein said housing is shaped to allow debris to collect at said outlet by gravity.

10. The tool of claim 1, said tool further comprising motor driven roller bars configured to support and move said separate rod.

11. The tool of claim 1, said tool further comprising sensors and one or more motor driven roller bars configured to support and move said separate rod in a back and forth direction when placed in said tool, said sensors detecting an end of said separate rod and switching a direction of rotation of said one or more roller bars.

12. A tool for cleaning sucker rods, said tool comprising a housing assembly containing:
- a) an annular ring assembly having gear teeth on an exterior surface thereof and bristles on an interior surface thereof with a central hollow or gap in said bristles for insertion of a separate rod to be cleaned;
- b) a gear operably connected to said gear teeth;
- c) an air motor operably connected to said gear to rotate said gear and thereby rotate said annular ring assembly and bristles;
- d) one or more split wiper ring sections for wiping said separate rod, said split wiper sections able to hingedly open and latch closed over said separate rod and containing split wiper rings for wiping said separate rod;
- e) an outlet operably positioned on a lower surface of said housing for debris to exit said housing, said outlet fluidly connected to a debris trap.

13. The tool of claim 12, said air motor operably connected to a separate air compressor and said debris trap operably connected to a separate vacuum pump.

14. A method of cleaning dirty sucker rods, said method comprising:
- a) removing a dirty sucker rod from a well;
- b) placing said dirty sucker rod horizontally into the tool of claim 1 or 12;
- c) operating said tool for a period of time to clean said dirty sucker rod until rid of all debris and form a cleaned sucker rod;
- d) inspecting said cleaned sucker rod for reuse or replacement;
- e) reusing said cleaned sucker rod in said well or replacing it with a new sucker rod; and f) repeating steps a)-e) for each additional dirty sucker rod in said well.

15. The method of claim 14, further comprising step b2 closing and latching said split wiper ring sections over said dirty sucker rod.

16. The method of claim 14, wherein said sucker rod cleaning tool is mounted on a mounting stand on site near said well.

17. The method of claim 14, wherein said sucker rod cleaning tool is near said well.

* * * * *